(12) United States Patent
Revanuru et al.

(10) Patent No.: US 7,216,158 B2
(45) Date of Patent: May 8, 2007

(54) SYSTEM, METHOD AND INTERFACE FOR CONTROLLING SERVER LIFECYCLE

(75) Inventors: Naresh Revanuru, San Jose, CA (US); Eric Halpern, San Francisco, CA (US); Mesut Gunduc, Califon, NJ (US)

(73) Assignee: BEA Systems, Inc., San Jose, CA (US)

( * ) Notice: Subject to any disclaimer, the term of this patent is extended or adjusted under 35 U.S.C. 154(b) by 723 days.

(21) Appl. No.: 10/346,305

(22) Filed: Jan. 17, 2003

(65) Prior Publication Data

US 2003/0225875 A1    Dec. 4, 2003

Related U.S. Application Data

(60) Provisional application No. 60/349,519, filed on Jan. 18, 2002.

(51) Int. Cl.
*G06F 15/173*    (2006.01)
(52) U.S. Cl. .............. 709/223; 709/223; 709/224; 709/228; 370/241; 370/259
(58) Field of Classification Search ............. 709/223, 709/224, 228; 370/241, 259
See application file for complete search history.

(56) References Cited

U.S. PATENT DOCUMENTS

| | | | |
|---|---|---|---|
| 5,884,022 A * | 3/1999 | Callsen et al. ............ 714/22 |
| 6,301,606 B1 | 10/2001 | Chessell et al. ............ 709/203 |
| 6,345,316 B1 | 2/2002 | Chessell et al. ............ 709/330 |
| 6,431,875 B1 | 8/2002 | Elliott et al. ............ 434/322 |
| 6,640,255 B1 * | 10/2003 | Snyder et al. ............ 719/315 |
| 6,701,438 B1 * | 3/2004 | Prabandham et al. ......... 726/11 |
| 2003/0028682 A1 * | 2/2003 | Sutherland ............ 709/315 |

* cited by examiner

*Primary Examiner*—Philip Tran
*Assistant Examiner*—Thuong Nguyen
(74) *Attorney, Agent, or Firm*—Fliesler Meyer LLP

(57) ABSTRACT

The current structure for starting and shutting down a server is complicated and affords little administrative control. A server must be started in one long-running step and cannot be shutdown without risk of disrupting in-flight work. The ability to bring up a server quickly and bring down a server gracefully is crucial to improving availability. A server configuration in which a server that is brought up as a hot-stand by server for a running, active server can significantly reduce downtime (failover time) in the case of an outage. A server that can be suspended gracefully can be removed from service without disrupting clients. These new features require improvements to the server lifecycle to clearly articulate the distinction between an initialized server and an active server (for hot standby) and between a suspending server and a suspended server (for graceful suspend) and to simplify the lifecycle by removing circular initialization dependencies between services and clarifying the lifecycle contract.

20 Claims, 3 Drawing Sheets

Server Lifecycle State Diagram & Control Operations

Server Lifecycle State Diagram & Control Operations

Server Lifecycle MBeam Operations

SYSTEM, METHOD AND INTERFACE FOR CONTROLLING SERVER LIFECYCLE

CLAIM OF PRIORITY

This application claims priority from provisional application "SERVER LIFECYCLE FUNCTIONAL SPECIFICATION" Application No. 60/349,519 filed Jan. 18, 2002, and which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to mechanisms for controlling the lifecycle of server processes and particularly to a structure for controlling the graceful startup and shutdown of servers.

BACKGROUND

In today's electronic commerce (e-commerce) environment, the ability to adapt quickly to the changing needs of a business partner or a customer can mean the difference between a business' success or failure. The global economy demands that e-commerce applications are available and ready, 24 hours a day, 7 days a week. The workhorse of today's Business-to-Business (B2B) and Business-to-Commerce (B2C) environments is the application server, an example of which is the WebLogic family of products developed by BEA Systems, Inc. San Jose, Calif. Application servers (and Internet-oriented web servers) provide the foundation for building such environments, allowing a business to quickly build and deploy scalable e-commerce applications using an open standards-based platform that grows as business needs demands. Using an advanced application server, a business can deliver innovative applications, attracting and retaining more customers.

Because of their strategic importance, most application servers allow a system administrator a considerable degree of control in actually managing the server. This degree of control becomes particularly important as the number of servers in an organization increases. Large organizations may have several dozen, even hundreds of application servers, each of which may operate independently of one another, and with typically little or no administrative input.

However, there will always come a time when this pool of servers must cooperate, for example in a maintenance situation in which one or more servers are being started, stopped, added or removed from the pool, or in a failover situation where a functioning server takes over the processing for another, failed server. Tasks like these are best handled through a combination of automatic processing that also allows administrative input where necessary. One of the problems with the current structure for starting and shutting down a server is that it is complicated and allows very little administrative control. The ability to start and stop servers quickly and gracefully would improve availability, but current methods do not allow this instead a server must be started in one long-running step and cannot be shut down without risk of disrupting in-flight work. What is desirable is a server configuration that allows a server to be brought up as a hot-standby server for a running, active server, and that allows servers to be suspended gracefully and removed from service without disrupting clients.

SUMMARY

The invention provides a framework for controlling the lifecycle of a server, or group of servers. As referred to herein a "server" refers to a server process or software process running on a physical "machine", piece of hardware, or computer. One or many servers can thus run on a single machine. The ability to bring up a server quickly and bring down a server gracefully is crucial to improving availability. A server configuration in which a server that is brought up as a hot-standby server for a running, active server can significantly reduce downtime (failover time) in the case of an outage. A server that can be suspended gracefully can be removed from service without disrupting clients. These new features require improvements to the server lifecycle to clearly articulate the distinction between an initialized server and an active server (for hot standby), and between a suspending server and a suspended server (for graceful suspend).

In one embodiment, the invention comprises a system for allowing a user or automated process to control the lifecycle of a server in an application server environment, comprising: a server, operating within said application server environment and having a server life cycle associated therewith; a plurality of services capable of operating with said server; an interface between said server and said plurality of services, said interface capable of being implemented by one or more of said services to allow the services to participate in the server lifecycle; and, a plurality of methods defined by or included within said interface for initializing, suspending, resuming and/or shutting down a server in cooperation with the services operating therewith.

DETAILED DESCRIPTION

Figure 1:
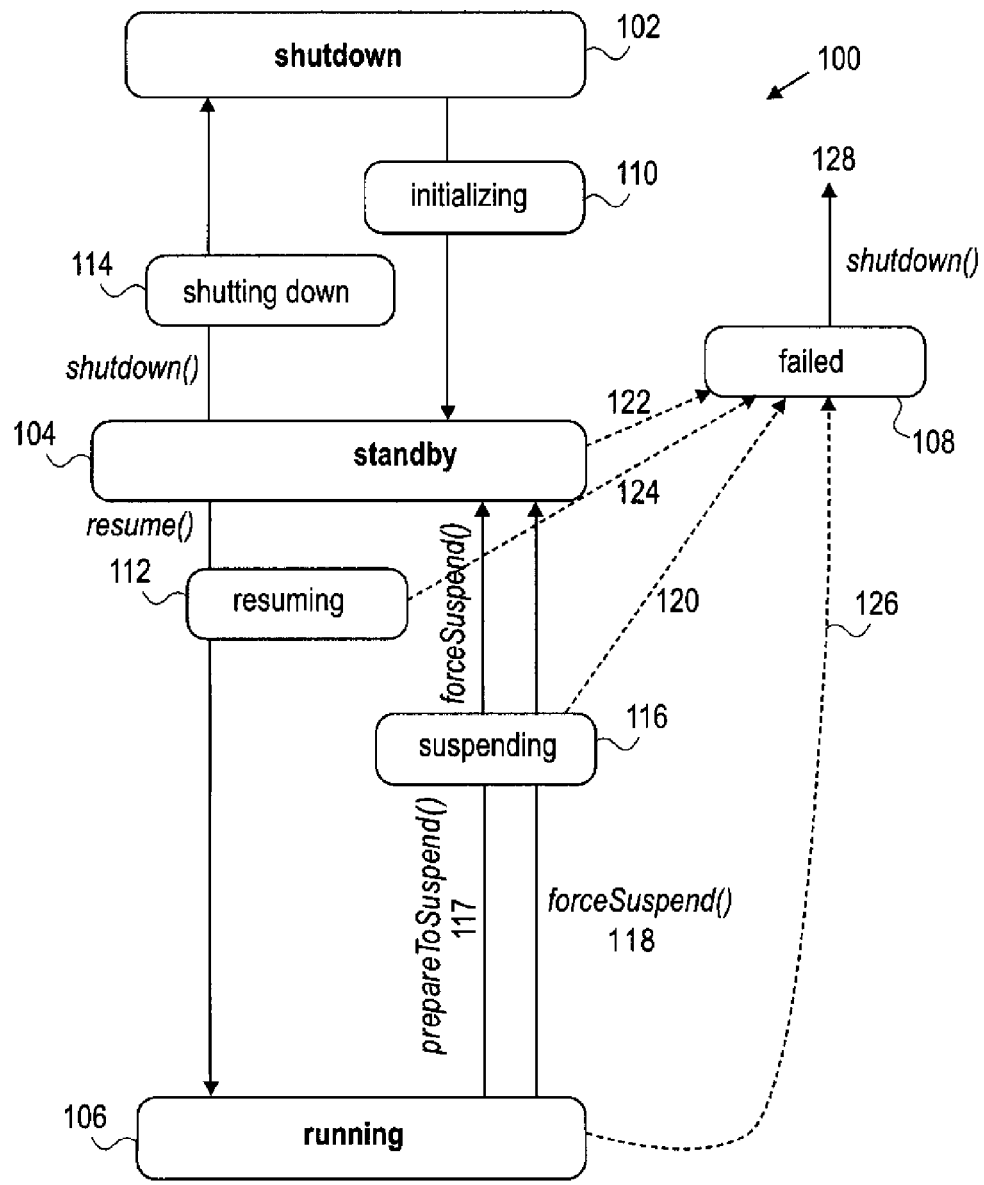
FIG. 1 shows lifecycle states and the legal state transitions as it applies to the lifecycle of a server and its services.

The current structure for starting and shutting down a server is complicated and affords little administrative control. Typically, a server must be started in one long-running step and cannot be shut down without risk of disrupting in-flight work. The ability to bring up a server quickly and bring down a server gracefully is crucial to improving availability. A server that can be brought up quickly can act as a hot standby for a running server and can significantly reduce downtime in the case of an outage. A server that can be suspended gracefully can be removed from service without disrupting clients. These new features as embodied in the invention utilize improvements to the server lifecycle to clearly articulate the distinction between an initialized server and an active server (for hot standby) and between a suspending server and a suspended server (for graceful suspend). The invention also simplifies the lifecycle by removing circular initialization dependencies between services and by clarifying the lifecycle contract.

As referred to herein a "server" refers to a server process or software process running on a physical "machine", piece of hardware, or computer. One or many servers can thus run on a single machine. The term "system" is used to refer to a system including a server which can employ the lifecycle framework described herein. Features provided by an embodiment of the invention include the following:

Hot standby—The invention allows an administrator (or in some cases an automatic server control process) to "bring up" or to initialize a server in a suspended state, where it is primed for quick activation. In this state the server may be fully administrable but should not claim resources that may be shared with a primary server (such as the same IP address, or a shared disk). Transition to and from the hot standby state is controllable through Java Management Extension (JMX) management utilities.

Graceful suspend—The invention also provides the ability to suspend a server without dropping in-flight work. Gracefully suspending a server will cause it to reject new requests, while at the same time letting in-flight requests complete. In some embodiments the system can detect the completion of all work and force a gracefully suspending server to stop all work. It is also possible to transition to and from the graceful suspend state, as well as determine if suspend is complete, through JMX utilities.

Well-defined startup order—The server lifecycle implementation must ensure that containers and their components are brought up in a well-defined order that avoids circular dependencies. This, in conjunction with enhancements to the application lifecycle, addresses potential problems with startup ordering.

Well-defined contract—The lifecycle contract should be clearly defined to ensure that implementation of an additional service is straightforward and that there are no delicate interdependencies between services.

ServerService—A server subsystem providing system level core service and/or a hosting environment for other entities.

KernelService—A system-level service that is considered to be part of server's kernel.

In accordance with one embodiment the server comprises both kernel (KernalService) and server (ServerServices) services. A kernel service provides kernel-level functionality (required by both WLS clients and servers). A ServerService provides server-level functionality. It acts as an integral part of the server and must participate in all stages of the server lifecycle. Each ServerService must implement the LifeCycle interface and register this implementation with the server. This interface defines the hooks required to participate in the server lifecycle.

FIG. 1 depicts the lifecycle states and the legal state transitions as it applies to the lifecycle of a server and its services. The lifetime of a server can be described by a small set of distinct states—shutdown 102, standby 104, running 106, failed 108, and the transitions between them. A server's initial state is inactive or shutdown 102. The server is configured, but is uninitialized in this state. It is started by transitioning its state to either standby 104, or running 106. Initialization is the first phase in either of these transitions.

A server package (in one implementation a Weblogic-.server package) defines the SPI that a ServerService must use to plug into the server. It includes the interfaces that a service must implement to hook into the server life cycle in addition the classes that provide access to server configuration and state. The server maintains a direct dependency graph reflecting the inter-dependency relationships among ServerServices that comprise it. A server state transition request triggers the server to invoke the relevant subsystem transition operations in an order driven by the dependency graph, such as the one shown in FIG. 1. The behavior of each state transition is as follows:

Shutdown>Standby (Initialize 110)

A server in shutdown state 102 does not exist as a process and therefore, consequently, within a server, shutdown state does not apply. However, one can imagine a shutdown state within a server as the state of non existence. The first phase of coming into existence is initialization and transitioning to standby state 104 as a result. Successful completion of the initializing state transition 110 results in the server being in standby state, ready for quick activation. This transition progresses through the following steps:

1. Server state set to initializing.
2. Configuration database synchronization. The management service synchronizes the local configuration with the Admin Server without relying on kernel services. When this step is complete, subsystems should be able to obtain their configuration from the appropriate MBeans without causing the kernel features to be used.
3. Kernel initialization. The kernel and each KernelService are initialized.
4. Subsystem initialization. Each ServerService is initialized in order.
5. Enable remote configuration. At this point, the management layer makes the server available for remote configuration and monitoring. Note that this means that each service must be able to support configuration requests in standby state.
6. Deployment initialization. The application manager installs each deployment in the appropriate container.

At the completion of these steps, the server enters standby state 104 and the state attribute is set to standby. It has completed all initialization, but is not yet accessible to external clients. It is remotely administrable and may be participating in cluster communication.

Standby>Running (Resume 112)

Successful completion of the resume state transition 112 results in the server entering the running state 106. In this state, the server is fully functional, offering its services to clients, operating as a full member of the cluster and is fully manageable.

Standby>Shutdown (Shutdown 114)

Successful completion of the shutdown state transition 114 results in the server entering the shutdown state 102. Immediately before a server is shutdown under controlled conditions, it is given the opportunity to release external resources. When the shutdown command is then issued the server commands each ServerService to shutdown in turn. Each service should respond by releasing resources that may not be quickly released by process shutdown. After this command has been issued, the server is no longer useable.

Running>Standby (Suspend 116)

Successful completion of the suspend state transition 116 results in the server entering the standby state 104. A server can be suspended either quickly (using a forceSuspend command 118) or gracefully (using a prepareToSuspend 117 command). When forceSuspend 118 is issued, the server will invoke the forceSuspend( ) method upon each ServerService in turn. In accordance with this method, each ServerService will stop accepting new work (except for administration requests), abort the relevant in-flight work immediately, and release remaining resources where applicable, (e.g. by closing files/network connections). This is the quickest way to suspend a server, but it may result in rolled-back transactions and session-loss for some clients. Administration requests are those requests that are made by a user authenticated as an administrator.

When a prepareToSuspend command is issued, the server first transitions itself to a transient suspending state, and invokes each ServerService's prepareToSuspend( ) method in proper order as determined by the dependency graph. Each ServerService, in accordance with this method, rejects new work but conversely allows in-flight work to complete. When all ServerServices are done with in-flight work, the server will invoke forceSuspend( ) on each ServerService and subsequently set the server state to standby 104.

Running>Shutdown (Shutdown/ForceShutdown 116/114)

Successful completion of the shutdown/force shutdown state transition results in the server entering the shutdown state 102. A server in running state can be shutdown either quickly (using a forceShutdown( )) command, or gracefully (using a shutdown( ) command).

The forceShutdown command is functionally equivalent of forceSuspend 118 (running>standby) followed by a shutdown command (standby>shutdown).

The (Graceful) shutdown command is functionally equivalent of a prepare ToSuspend command 117 (running>standby) followed by a shutdown command (standby>shutdown).

Failing (Suspending>Failed 120; Standby>Failed 122; Resuming>Failed 124; And Running>Failed 126)

A subset of ServerServices may fail (i.e., become dysfunctional) during the active lifetime of the server. When these failure conditions occur, the states of the affected services transition to a failed state 108. The state of the server will transition to a failed state if at least one of the required (dependent) ServerServices fails. When the server enters this state the only option left is to reactivate the server.

Failed>Shutdown (Shutdown)

In the failed>shutdown transition 128, cleanup occurs if applicable. This transition gives an opportunity to the server services to do a last-minute cleanup, (e.g. to perform persistent store updates, releasing resources before server inactivates itself etc.).

Server Dependencies

Figure 2:
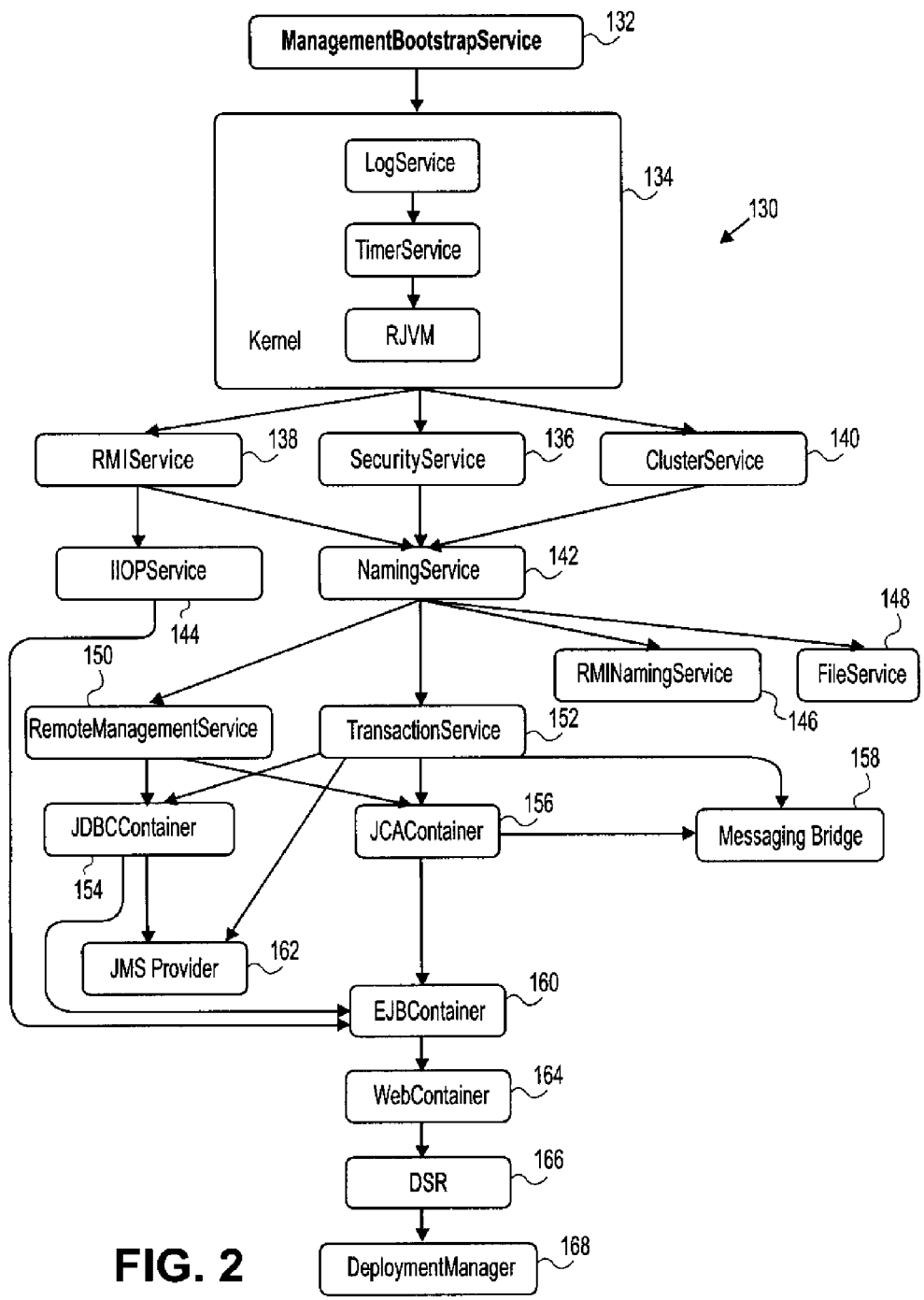
FIG. 2 shows a set of services and their startup order reflecting dependencies among them.

In order to simplify the lifecycle implementation and provide startup order guarantees, it is necessary to reduce service initialization dependencies, and more importantly, remove cyclic dependencies. FIG. 2 illustrates a proposed set of services 130 in accordance with one embodiment of the invention, and their startup order reflecting dependencies among the various services. A particular ServerService may depend on other ServerServices. For example, the NamingService 142 depends on SecurityService 136, RMIService 138 and ClusterService 140, and each of these dependents in turn depends on Kernel level service 134. A server depends on the ServerServices that it hosts (i.e. contains) and both the server and all its ServerServices are subject to lifecycle control. Any combination or all the ServerServices specified in FIG. 2 may be considered to be required (i.e., dependent) ServerServices for a successful initialization of the server. If a required ServerService's state changes to failed status, then the server's state will also be set to failed. Other services and dependencies that can be evaluated include IIOPService 144, RMINamingService 146, FileService 148, RemoteManagementService 150, TransactionService 152, JDBCContainer 154, JCAContainer 156, MessagingBridge 158, EJBContainer 160, JMSProvider 162, WebContainer 164, DSR 166 and DeploymentManager 168.

The dependencies illustrated in FIG. 2 may be automatically based on the dependency attributes of the ServerServices. Initialization of non-critical ServerServices (i.e., those ones on which others do not depend) may be deferred until needed through some configuration parameters.

Claiming Resources

A suspended server may claim certain external resources but not these resources that are reserved for active servers. The following guidelines should be considered when determining what resources may be claimed by a particular ServerService.

Licencing—A suspended server will be treated like an active server as far as licencing enforcements are concerned.

IP Addresses—The server must bind to the administration port when suspended, but need not bind to the external listen port. If the external address is shared with another server (which might be the case under a high availability (HA) framework, the server must be configured to use a different address for administration.

Resource connections—In some cases, it may be desirable to pre-connect to external resources while suspended (to speed up activation for example). In other cases, it may be desirable to defer claiming connections until activation (to conserve licenses for example). A resource adapter that requires this flexibility must provide configuration options to control this behavior.

Shared disks/files—In some cases a disk or a particular file that requires exclusive access may be shared by both a primary server and its hot-backup. In these cases the secondary is not allowed to access this disk/file until the secondary has become active.

Server Lifecycle Contract

In one embodiment, a Weblogic.server package defines the SPI that a ServerService must use to plug into the server. The package includes the interfaces that a service must implement to hook into the server life cycle, in addition to classes that provide access to server configuration and state. ServerServices implementing this interface use the following naming convention for the implementation class name:

<ServerService name> LifeCycle where <ServerService name> is the unique name of a ServerService implementing the interface.

Interfaces

The following interface descriptions define a particular embodiment of the interfaces used to support the invention in controlling the lifecycle of a server. It will be evident to one skilled in the art that other interfaces can be used beyond those described, and that the invention is not limited to the particular implementation shown.

ServerLifeCycle

```
public interface ServerLifeCycle {
public void    initialize( ) throws ServerLifecycleException ;
public void    prepareToSuspend( ) throws ServerLifecycleException ;
```

```
public void    forceSuspend( ) throws ServerLifecycleException ;
public void    resume( ) throws ServerLifecycleException ;
public void    shutdown( ) throws ServerLifecycleException ;
}
```

A service must implement the ServerLifeCycle interface to plug into the server and participate in its lifecycle.

Method Summary

```
void initialize( )
    Initializes a service moving it to standby state.
void prepareToSuspend( )
    Suspends an active service gracefully, moving it to standby state.
void forceSuspend( )
    Force suspends the service moving it to standby state.
void resume( )
    Resumes a suspended service, moving it to running state.
void shutdown( )
    Deactivates a service, moving it to shutdown state. Given a particular
service, this operation may or may not be applicable. The operation performs
service level cleanup. The interpretation of what this cleanup would be is
determined by the service, e.g. updating some persistent store data, logging
some data.
```

Method Detail

The following section describes in further detail the operation of the methods discussed under method summary above.

Initialize

```
public  void  initialize(FailedStateCallback  failedStateCallback)
    throws ServerLifecycleException
```

This method initializes the service moving it to the standby state. The service is free to read its configuration, and may claim any resources that are not reserved for active servers. It may not serve client requests, use cluster services, or pass out external references to this server. Typically, a service will perform the following steps to initialize.

1. Check licenses;
2. Check configuration for consistency; and
3. Initialize in all ways that don't require claiming resources reserved for active servers. This may include exporting RMI objects, binding services to JNDI and claiming external resources that are required for fast activation.

Parameters include a failedStateCallback parameter—a callback to be invoked when a failure occurs during initialization.

prepareToSuspend

```
public     void   prepareToSuspend(SuspendCompletedCallback
    completionCallback) throws ServerLifecycleException
```

This method suspends the service moving it to the standby state. This method causes the service to begin rejecting new requests that are not associated with in-flight work. In general, a container should allow local requests but should not allow requests from external clients. One exception provides that if an external request is part of a transaction or a session that can't be recovered, it should be allowed.

Parameters include a completionCallback parameter—a callback to be invoked when service has finished servicing all in-flight requests.

forceSuspend

```
public void   forceSuspend( )  throws ServerLifecycleException
```

This method force-suspends the service moving it to the standby state. This method causes the service to reject all new requests, abort any in-flight work immediately and release any resources that are reserved for active servers.

resume

```
public  void resume( )  throws ServerLifecycleException
```

This method activates service moving it to the active state. At the completion of this method, the service is capable of servicing external requests. This typically involves completing the initialization that is only possible once a service can claim resources restricted to active servers.

shutdown

```
public  void shutdown( )   throws ServerLifecycleException
```

This method shuts down the service moving it to shutdown state. This method is called immediately before the server process is shutdown. This is the last opportunity that a service has to release external resources. Typically, there is no work for a service to do at this point.

Field Summary

The following section describes the fields that can be used to identify various server states.

static int SHUTDOWN
    A server in this state is a configured and deployed, but not initialized server.
static int FAILED
    A server in this state is a failed server, i.e., it is dysfunctional. The only way out of this state is to restart the server.
static int INITIALIZING
    A server in this state is being initialized, i.e., the state is transitioning from SHUTDOWN to STANDBY state. This is a transient state.
static int STANDBY
    A server in this state is an active server, i.e., it is remotely administrable, but is not yet servicing clients.
static int SUSPENDING
    A suspending server is in the process of gracefully suspending service to clients. This is a transient state.
static int RESUMING
    A server in this state is in the process of resuming its services, i.e. enabling its services to external clients. This is a transient state in which the state is transitioning from STANDBY to RUNNING state.
static int RUNNING
    A server in this state is an active server, i.e., it is fully functional and providing service to clients.
static int SHUTTING_DOWN
    A server in this state is in the process of being deactivated. This is a transient state.

SuspendCompletedCallback

```
public interface SuspendCompletedCallback {
    void suspendSuccessfullyCompleted(ServerLifeCycle service) ;
    void suspendFailed(ServerLifeCycle service);
}
```

The callback that a ServerService uses to notify the server that it has completed state change operation.

Method Summary

```
void suspendSuccessfullyCompleted(ServerLifeCycle service)
void suspendFailed(ServerLifeCycle service)
```

Method Detail suspendSuccessfullyCompleted

```
void suspendSuccessfullyCompleted(ServerLifeCycle service)
```

Called by a ServerService to indicate that it has successfully completed processing of state change operation.

suspendFailed

```
void suspendFailed(ServerLifeCycle service)
```

Called by a ServerService to indicate that it has failed processing of state change operation in a unrecoverable way.

FailedStateCallback

```
public interface FailedStateCallback {
    void serviceFailed(ServerLifeCycle service) ;
}
```

The callback that a ServerService uses to notify the server that it has failed.

Method Summary

```
void serviceFailed(ServerLifeCycle service)
```

Method Detail serviceFailed

```
void serviceFailed(ServerLifeCycle service)
```

Called by a ServerService to indicate that it has failed.

ServerLifecycleException

```
public class ServerLifecycleException
extends weblogic.utils.NestedException
```

Indicates that a failure occurred during a state transition in the server lifecycle.

Constructor Summary

ServerLifecycleException(java.lang.String message)

ServerLifecycleException(java.lang.String message, java.lang.Throwable rootCause)

ServerLifecycleException(java.lang.Throwable rootCause)

Software Interfaces (Javadoc, MBean, Objects, Classes)

Figure 3:
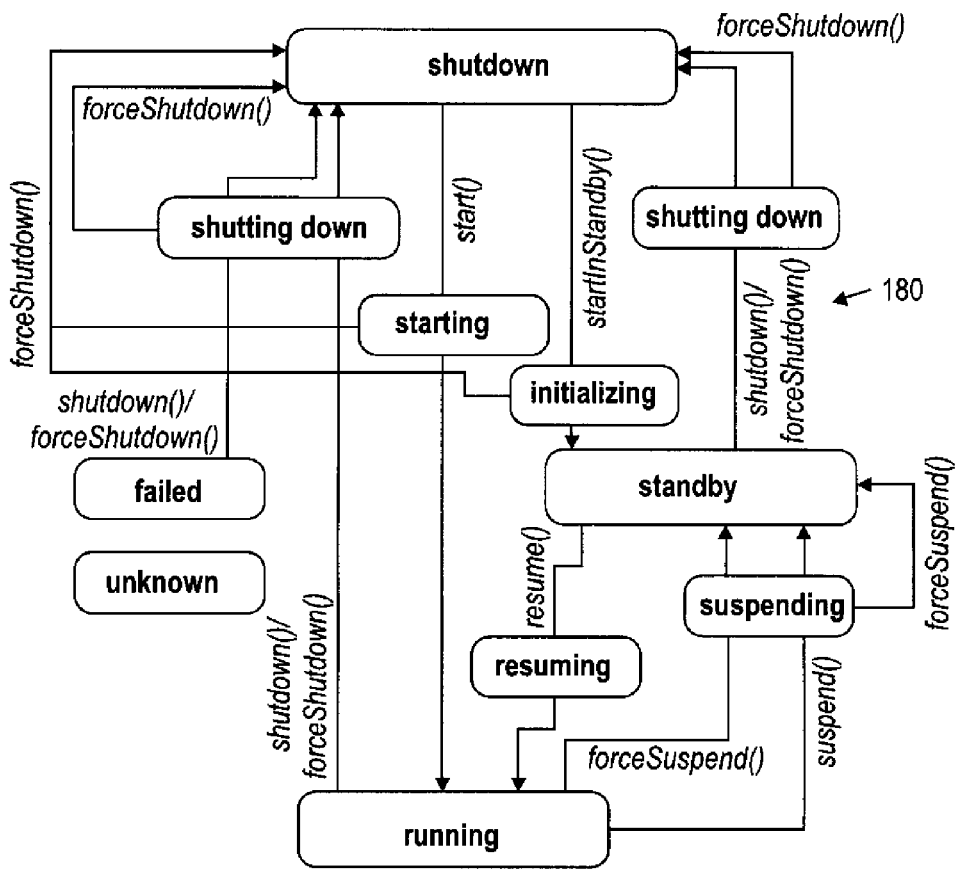
FIG. 3 shows from the client view (i.e., an Admin Server, or Node Manager) the server lifecycle states, and the legal state transitions as it applies to the lifecycle of a server.

FIG. 3 illustrates in accordance with one embodiment the client view (i.e., from the view of an Admin Server, or Node Manager etc.) of the lifecycle states and the legal state transitions as they apply to the lifecycle of a server. In one embodiment, a ServerRuntimeMBean interface provides additional methods 180 for server lifecycle as follows:

```
public void   startInStandby( ) throws ServerLifecycleException
Initialize the server, bringing it to STANDBY state.
public void resume( ) throws ServerLifecycleException
Resume the server, bringing it to RUNNING state.
public void start( ) throws ServerLifecycleException
Start the server, bringing it to RUNNING state.
public void suspend( ) throws ServerLifecycleException
Suspend the server gracefully, bringing it to STANDBY state.
public void forceSuspend( ) throws ServerLifecycleException
Force suspend the server, bringing it to STANDBY state.
public void shutdown( ) throws ServerLifecycleException
Shutdown the server gracefully, bringing it to SHUTDOWN state.
public void forceShutdown( )throws ServerLifecycleException
Shutdown the server forcefully, bringing it to SHUTDOWN state.
public static final java.lang.String STARTING
Value returned by getState( ) to indicate that the server is being activated.
public static final java.lang.String SHUTTING_DOWN
Value returned by getState( ) to indicate that the server is being deactivated.
public static final java.lang.String STANDBY
Value returned by getState( ) to indicate that the server is/has been suspended.
public static final java.lang.String SUSPENDING
Value returned by getState( ) to indicate that the server is being suspended.
public static final java.lang.String RESUMING
Value returned by getState( ) to indicate that the server is being activated.
public static final java.lang.String RUNNING
Value returned by getState( ) to indicate that the server is active.
public static final java.lang.String SHUTDOWN
Value returned by getState( ) to indicate the the server is inactive.
public static final java.lang.String FAILED
Value returned by getState( ) to indicate the the server is in FAILED state.
public static final java.lang.String UNKNOWN
Value returned by getState( ) to indicate the the server is in UNKNOWN state.
This is usually means that the server's state is UNKNOWN because it is
unreachable.
```

Administration Console

In one embodiment an Administration Console can be provided to allow an administrator to control the lifecycle of the server, for example by right clicking the mouse when a server node is selected in a domain tree. The following options can be made available: Start this server in Standby mode; Start this server; Resume this server; Suspend this server; Force suspend this server; Shutdown this server; Force shutdown this server. It will be evident that other options and commands may be made available in the Administration Console, depending on the particular needs of the administrator.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for allowing an automatic process to control the lifecycles of servers in an application server environment, the system comprising:
    a primary server that operates within the application server environment, currently claims a plurality of resources, including Internet protocol addresses and disks, and has a server lifecycle associated therewith that comprises a running state;
    a standby server that operates within the application server environment and has a server lifecycle associated therewith that comprises a standby state and a running state, wherein in the standby state the standby server is administrable by the automated process and is prepared to claim the plurality of resources currently claimed by the primary server;
    a first plurality of services that operates with the primary server, such that when the primary server is brought from the running state to a shutdown state, a set of the first plurality of services stop primary server acceptance of new work, allow primary server work in progress to complete, and release the plurality of resources currently claimed by the primary server;
    a second plurality of services that operate with the standby server, such that
        when the standby server is brought to the standby state, a first of the second plurality of services are initialized and claim resources other than those currently claimed by the primary server, and
        when the standby server is subsequently brought to a running state, a second set of the second plurality of services are then initialized and claim the remaining resources previously claimed by the primary server;
    an interface between the standby server and the second plurality of services, wherein the interface allows the second plurality of services to participate in the standby server lifecycle; and
    a plurality of functions defined by the interface that transition the standby server from the standby state to the running state and allow the standby server to take over from the primary server.

2. The system of claim 1 wherein the plurality of functions are accessed by the standby server to control or to receive information from the plurality of services.

3. The system of claim 1 wherein the plurality of functions are accessed by software application.

4. The system of claim 3 wherein the software application comprises an administration module, wherein the administration module includes a graphical user interface to allow an administrator or other user to control the operation of the standby server and its associated server lifecycle.

5. The system of claim 1 wherein the plurality of functions comprises a function for initializing the standby server from the shutdown state and placing it in the standby state.

6. The system of claim 1 wherein the plurality of functions comprises a function for resuming the operation of the standby server from the standby state and placing it in the running state.

7. The system of claim 1 wherein the primary and standby server lifecycle states further comprise starting, initializing, resuming, suspending, shutting down, failed and unknown states.

8. The system of claim 1 wherein the plurality of functions comprises a function for suspending the operation of the standby server from the running state and placing it in the standby state.

9. The system of claim 1 wherein the plurality of services are initialized in dependency order.

10. The system of claim 1 wherein each of the plurality of services implement the interface to plug into the standby server and participate in its lifecycle.

11. A method for allowing an automatic process to control the lifecycles of servers in an application server environment, the method comprising:
    providing a primary server that operates within the application server environment;
    claiming by the primary server a plurality of resources, including Internet protocol addresses and disks;
    associating the primary server with a server lifecycle that comprises a running state;
    providing a standby server that operates within the application server environment;
    associating the standby server with a server lifecycle that comprises a standby state and a running state, wherein in the standby state the standby server is administrable by the automatic process and is prepared to claim the plurality of resources currently claimed by the primary server;
    providing a first plurality of services that operate with the primary server, such that when the primary server is brought from the running state to a shutdown state, a set of the first plurality of services stop primary server acceptance of new work, allow primary server work in progress to complete, and release the plurality of resources currently claimed by the primary server;
    providing a second plurality of services that operate with the standby server, such that
        when the standby server is brought to the standby state, a first set of the second plurality of services are initialized and claim resources other than those currently claimed by the primary server, and
        when the standby server in subsequently brought to a running state, a second set of the second plurality of services are then initialized and claim the remaining resources previously claimed by the primary server;
    providing an interface between the standby server and the plurality of services, wherein the interface allows the plurality of services to participate in the standby server lifecycle;
    defining by the interface a plurality of functions for transitioning the standby server from the standby state to the running state and allowing the standby server to take over from the primary server; and
    allowing said plurality of services to user said plurality of methods to participate in the server lifecycle.

12. The method of claim 11 wherein defining by the interface a plurality of functions comprises accessing by the standby server the plurality of functions to control or to receive information from the plurality services.

13. The method of claim 11 wherein defining by the interface a plurality of functions further comprises accessing by a software application the plurality of functions.

14. The method of claim 13 wherein accessing by a software application further comprises using an administration module that includes a graphical user interface to allow an administrator or other user to control the operation of the standby server and its associated server lifecycle.

15. The method of claim 11 wherein defining by the interface a plurality of functions further comprises initializing by a function the standby server from the shutdown state and placing it in the standby state.

16. The method of claim 11 wherein defining by the interface a plurality of functions further comprises resuming by a function the operation of the standby server from the standby state and placing it in the running state.

17. The method of claim 11 wherein the primary and standby server lifecycle states further comprises starting, initializing, resuming, suspending, shutting down, failed and unknown states.

18. The method of claim 11 wherein defining by the interface a plurality of functions further comprises suspending the operation of the standby server from the running state and placing it in the standby state, wherein the suspending and placing is performed by a function.

19. The method of claim 11 wherein providing a second plurality of services further comprises initializing the plurality of services in dependency order.

20. The method of claim 11 wherein providing a second plurality of services further comprise implementing the interface to plug into the standby server and participating in its lifecycle.

* * * * *